(12) United States Patent  
Shulman

(10) Patent No.: US 8,000,895 B2  
(45) Date of Patent: *Aug. 16, 2011

(54) NAVIGATION AND INSPECTION SYSTEM

(75) Inventor: Alan Shulman, Santa Rosa, CA (US)

(73) Assignee: Doubleshot, Inc., Rohnert Park, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 12/135,841

(22) Filed: Jun. 9, 2008

(65) Prior Publication Data

US 2009/0015685 A1    Jan. 15, 2009

Related U.S. Application Data

(63) Continuation of application No. 11/326,820, filed on Jan. 6, 2006, now Pat. No. 7,386,394.

(60) Provisional application No. 60/641,906, filed on Jan. 6, 2005.

(51) Int. Cl.
*H04N 5/225* (2006.01)
*G01C 21/00* (2006.01)

(52) U.S. Cl. .......... 701/213; 701/26; 701/210; 348/169; 342/357.09

(58) Field of Classification Search .................. 701/213, 701/26, 210, 211; 348/169, 222.1, E50.24; 342/357.09
See application file for complete search history.

(56) References Cited

U.S. PATENT DOCUMENTS

| | | | |
|---|---|---|---|
| 5,486,819 A | 1/1996 | Horie | |
| 5,517,419 A | 5/1996 | Lanckton et al. | |
| 6,154,133 A | 11/2000 | Ross et al. | |
| 6,163,755 A | 12/2000 | Peer et al. | |
| 6,246,933 B1 | 6/2001 | Bague | |
| 6,480,120 B1 | 11/2002 | Meunier | |
| 2003/0147465 A1* | 8/2003 | Wu et al. | 375/240.11 |
| 2004/0225425 A1 | 11/2004 | Kindo et al. | |
| 2004/0257440 A1 | 12/2004 | Kondo et al. | |
| 2008/0192129 A1* | 8/2008 | Walker et al. | 348/231.2 |

OTHER PUBLICATIONS

Australian Government, IP Australia: Examiner's Report on Australian Patent Application No. 200603980; Mar. 24, 2009; 4 pages.

* cited by examiner

*Primary Examiner* — Tan Q Nguyen
(74) *Attorney, Agent, or Firm* — Finnegan, Henderson, Farabow, Garrett & Dunner LLP

(57) ABSTRACT

A method of detecting a changed condition within a geographical space from a moving vehicle. Images of that geographic space are memorialized in conjunction with GPS coordinates together with its GPS coordinates. The same geographic space is traversed from the moving vehicle while accessing the route's GPS coordinates. The memorialized images are played back by coordinating the GPS data on a memorialized images with that of the traversed geographic space such that the memorialized images are viewed simultaneously with the geographic space being traversed. An observer traveling within the moving vehicle can compare the memorialized images with those being traversed in order to identify changed conditions.

19 Claims, 1 Drawing Sheet

NAVIGATION AND INSPECTION SYSTEM

CROSS REFERENCE TO RELATED APPLICATIONS

This is a continuation of application Ser. No. 11/326,820, filed Jan. 6, 2006, now U.S. Pat. No. 7,386,394 which claims the benefit of Provisional Application No. 60/641,906, filed Jan. 6, 2005, which are incorporated herein by reference.

FIELD OF THE INVENTION

Video is typically recorded by time, for example, 30 frames per second. By selecting which frames to record and or use according to GPS of the camera position or according to distance traveled, a new database is created. This video or sequential image database incorporates geographically referenced images that are spatially related rather than time related. By the selection of a distance between frames to identify which frames are to be acquired rather than time, a dramatically smaller database results that is able to be searched more easily. This provides for a dramatically reduced size in the database and is a technique of data compression. Specific frames or data can be more easily retrieved by geographic position that can be determined by global position satellites, inertial systems or other electro mechanical sensors. Traditionally, forward looking video views have not been recorded by distance traveled or relative geographic position. They are separated by time rather than distance. The present invention involves a navigation and inspection system having particular utility for a more precise form of vehicle navigation or inspection of nearby objects. For example it could be used if one desires to rapidly perform an inspection of a roadway looking to identify a new crack or hole in the pavement of a roadway, tunnels or bridges or roadside encroachment due to vegetation or land movements. In addition, changes in nearby objects such as power lines, building facades, parked cars can be identified. Other applications include enhanced nighttime driving to provide a daytime image of the current position and heading, a more precise navigation to conform a vehicle to precisely navigate over a previously identified path and the enhancement of current imagery with previously acquired data or imagery such as objects recorded during daytime fused with the night time imagery.

It is also possible to use the invention to identify a current GPS position by selecting the closest matching frame in the database with a known GPS co-ordinate that was previously acquired.

BACKGROUND OF THE INVENTION

In the past, topography including roadways have been geomapped, principally by aircraft traveling above the to be mapped region from top down views. However, in light of wobbling aerial camera platforms, look angle limitations and lens distortions converting an aerial map of a region to a surface based operator view, prior geomapping techniques have proven complex. Additional complications come from the mosaicing techniques that are required to integrate frames along the route being traveled into a searchable database. Further, for a vehicle operator to identify changes between geomapped imagery, it has been determined to be cognitively most helpful to provide a split screen or some other type of parallel tracking display of a geomapped route to the route currently being navigated to enable rapid comparisons to be made between current conditions and those which act as a standard upon which future actions or inspections would be based.

The hardware requires the simultaneous or near simultaneous display of the current image and the geographically referenced database image.

It is thus an object of the present invention to provide a ready means of providing a vehicle operator sufficient information to enable the operator to identify surface changes or nearby feature changes or identify a specific changes in nearby objects or their relative positions.

It is yet a further object of the present invention to provide means of alerting the driver to upcoming road conditions by looking forward in the database to what is over a hill or around a bend.

It is yet a further objective of the present invention to integrate information from the inspection of roadways or other roadside conditions in a format which highlights such conditions and hazards and which presents them to a vehicle operator in a timely fashion to provide the operator the opportunity to take effective remedial action.

It is a further object to provide daytime views given a GPS location and heading.

It is a further object to present to a driver a behind the vehicle view based on previous views with the vehicle perimeter represented on screen so that the current relationship of the wheels to hazards can be viewed and is approximately accurate to the current vehicle position.

It is further object to provide a means to reduce the number of frames and size of a database by recording imagery by distance separation rather than time. This was usually done by recording all frames in a sequence done at 30 frames per second and tagging the GPS position on all thirty frames. Although the invention can be practiced with all 30 frames, the preferred embodiment is to record a frame after the camera has moved a specified distance to reduce the bandwidth and storage capacity required.

It is further object to utilize other forms of imagery or data such as ladar, radar, sonar, magnetics, multi-spectral, audio, computer renderings from depth maps or wireframes or other forms of data such as sound that can be discretely acquired by geoposition. These alternative sources of data can be mixed such as thermal with daytime video, magnetics with video, multi-spectral with rendered imagery.

It is further object to identify a current GPS position by selecting the closest matching frame in the database with a known GPS co-ordinate that was previously acquired.

These and further objects will be readily apparent when considering the following disclosure.

SUMMARY OF THE INVENTION

The present invention involves a method of detecting a changed condition within a geographic space from a moving vehicle. The method comprises capturing and memorializing images of the geographic space in conjunction with GPS/geographic coordinates associated with said geographical space. The geographical space is traversed from said moving vehicle while accessing GPS or other geographic coordinates. The memorialized images are accessed and played back by coordinating geographic coordinate data on said memorialized images with the traversing of said geographic space such that said memorialized images being viewed are of the same geographical space being traversed, (i.e. the position of the camera now and in the past are within the same geographic coordinates and headings+/− some tolerance). Both memorialized images and the images of the traversed geographic space are presented to an observer enabling the observer to make a direct comparison of the memorialized images and images of the geographic space being traversed to the observer. Ideally, the memorialized images are created by employing a video camera which can also be used to present the geographic space being traversed. Alternatively, other image capturing devices can be employed such as infrared cameras, sonar, or sensor data such as magnetic or sound data that can be graphically represented on a screen. To present the most direct comparison, the camera presenting the traversed images from the moving vehicle should be placed in approximately the same location and heading as that of the camera employed to capture the memorialized images with a similar field of view. Fields of view can be better matched optically or by electronic scaling. Image stabilization techniques can also be used to improve the relative registration between images. Both images can be presented upon a screen, such as a split screen in which the traversed images are presented above and the memorialized images are presented below. Alternative displays such as sequential presentations, alternating, superimposition or keying and matting techniques can also be used. By GPS coordination, the images of the same geography are presented to an observer simultaneously enabling the observer to quickly and intuitively recognize any changed conditions in the roadway. Further, although the memorialized images and traversed images can be taken and captured during the daytime to provide a meaningful comparison with daylight views, the present invention can also be employed to enhance night driving by comparing memorialized images taken during the day when visibility is relatively good and playing back those images on a suitable split screen with real time images taken at night or during inclement weather. The display of the recorded daylight single view selected by current GPS position presents valuable information that may not be visible in the current situation. The simultaneous display of the current and previous condition would not be required. Sometimes in inclement weather or GPS obstruction, the current GPS could be lost. By comparison of current imagery to the database imagery, a current GPS position could be selected by the closest image match to a specific frame in the database.

Because a driver may not have a direct view of his wheels in relationship to a ravine or cliff or other hazard, an accidental roll over can occur. By using a gps based offset that is some distance behind a vehicle, a navigation view can be presented to a driver. The outline perimeter of the vehicle including its wheels can be superimposed over the collected imagery. A view can be displayed that includes a view of the road and vehicle that appears to be from a camera behind the vehicle. This is accomplished by using a GPS position that is approximately 20 feet from the current position to determine the video frame best associated with the current position.

By placing a dot (Breadcrumb) in the proper location on a cartesean coordinate system on the display one can create a map that represents the memorialized data. Breadcrumb marks on a top down map for each frame can then be composited to provide accurate maps of the driven area. These maps may be overlayed onto standard reference maps which may be imported into the system. This provides a graphic interface that can be used to present the view of the route that at any specific speed selected.

Change detection is enhanced at night by the use of auxiliary lighting in the visible or infrared wavebands. At night, using auxiliary lighting placed lower than the camera, exaggerates elongated shadows to produce an enhanced shadow effect to highlight changes. This auxiliary lighting can be constant or pulsed to co-ordinate with the GPS capture of the frame after a specific distance is traveled. The lighting can be in the visible and/or non-visible range.

DETAILED DESCRIPTION OF THE INVENTION

Figure 1:
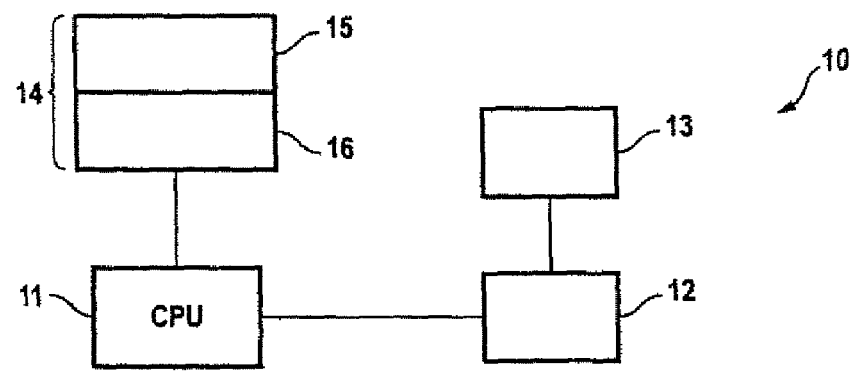
FIG. 1 is a schematic block diagram of the essential components necessary in carrying out the present invention.

Others, in the past, have taught methods of recording images and associating them with GPS or geographic coordinate data to provide playback that was position, rather than time dependent. For example, reference is made to U.S. Pat. No. 6,741,790, the disclosure of which is incorporated by reference. The '790 patent teaches a system including hardware and software which are configurable and operable in three modes, namely, recording mode, indexing mode and playback mode. In the recording mode, the hardware employed therein is connected to a GPS receiver and video recording device and permits GPS data to be recorded on the same recording medium that images are recorded on using the video recording device. As a result, a particular geographic location associated with particular images can be directly referenced by GPS data. After recording the images, the hardware device is connected to a computer having the appropriately installed software causing the GPS data to be transferred from the recording medium to the computer as the recorded images are played. During this indexing step, the computer draws a map showing all of the GPS reference locations recorded on the recording medium. Each map location represents a location where images were recorded with GPS data. Once the indexing mode is completed, the system disclosed in the '790 patent can be used to play back the images so recorded, in accordance with the selection of a location on the map. During this step, called the playback mode, a marker may be selected on the computer generated index map and the system will cause the video recording device to play back the images that were recorded at the selected location. The '790 patent also teaches recorded images being transferred to some other media such as a CD ROM or hard disk causing the computer to play back the images that were recorded at that selected location. However, no one to applicant's knowledge has adapted this technology for the purpose presented herein. For example, the present invention can in its preferred embodiment, use GPS to determine when a picture is recorded to reduce the number of frames in memory and which image to be called during playback. Although all frames can be recorded, it is best to only record those separated at a deliberately set distance. Thus the camera frame rate is dependent on the velocity of the camera. This can also increase the required camera frequency of recorded imagery past 30 frames per second for higher travel velocities through the use of a GPS triggered camera.

In addition, U.S. Pat. No. 6,895,126 teaches a system and method for synthesizing images of a locale to generate a composite image that provides a panoramic view of the locale. The '126 patent discloses employing a video camera moving along a street recording images of objects along the street. The GPS receiver and inertial navigation system provide the position of the camera as the images are being recorded. The images are indexed with the positioned data provided by the GPS receiver and inertial navigation system. According to one aspect of the '126 invention, an image recording device moves along a path recording images of objects along the path. As noted, the GPS receiver and/or inertial navigation system provides position information of the image recording device as the images are being acquired. The image and position information are provided to a computer to associate each image with the position information. As such, it is known in the prior art to associate GPS coordinates with recorded image data for later playback. The disclosure of U.S. Pat. No. 6,895,126 is incorporated herein by reference.

As a first embodiment, the present invention involves a detection system utilizing human intervention to detect changes in a scene by displaying video of a topography such as a roadway along with imagery captured from a previous trip. During acquisition, the system captures images from a live video feed and "meta-tags" them with additional information including the location and orientation of a specific viewpoint. Important "meta tag" information would include, for example, direction of travel and GPS coordinates and or elevation. These 'meta tags' are then associated with specific frames of the previously taken video image. During playback, the system utilizes current location and orientation through GPS data acquisition to recall imagery previously captured from approximately the same location and orientation. Ideally, the two images are displayed on a single screen above and below one another. In some applications, such as driving at night, only the stored view will be displayed. GPS data acquisition provides the coordinates that determine the closest "stored views" to the vehicle's current location. This can also be done using various "closest matching frame" software. This system then selects corresponding views from a database to produce the nearly exact view that a vehicle operator, such as a soldier, is observing in real time in the vehicle. Compensation of the database view can be made for variances in camera Field of View, speed, distance to the center of the road and X and Y variances from the position on the road from which the reference data was taken. These corrections can be determined from physical sensors on the camera platform such as inclinometers and accelerometers or from calculations derived from the sequence of images. The information is presented in an enhanced format for easy comparison to the observer to enable a vehicle operator to make real time decisions about a road hazard.

As a preferred embodiment, the image can be deliberately distorted by increasing the horizontal width to minimize the relative vertical motion or an unusual horizontal aspect ratio can be used to provide the viewer with less vertical distance between before and after pictures thus minimizing eye movement. This can be done, for example, by cropping the image reducing the area above the horizon In carrying out this function, reference is made to FIG. 1 showing system 10 as constituting one version of the present invention. Specifically, system 10 includes a computer 11 which is fed information from elements 12 and 13. Element 12 is an image source generator such as a visual or thermal camera which is employed in conjunction with GPS device 13 to "meta tag" frames generated from camera 12 and applied to computer 11 for storage. The image developed through this established reference would appear in the bottom portion of split screen 14 in image area 16 as discussed further in reference to FIG. 2. When traveling over the same route upon which the image projected in field 16 is played back, camera 12 again generates an image and the image thus created is coordinated with GPS device 13 and "meta tagged" with GPS device 13 and is again introduced to computer 11 which generates a real time image in upper frame 15 of display 14. Because the stored image and current image are both "meta tagged" with GPS coordinates, playback of a specific scene in conjunction with a current route being undertaken are coordinated for directed comparison.

Figure 2:
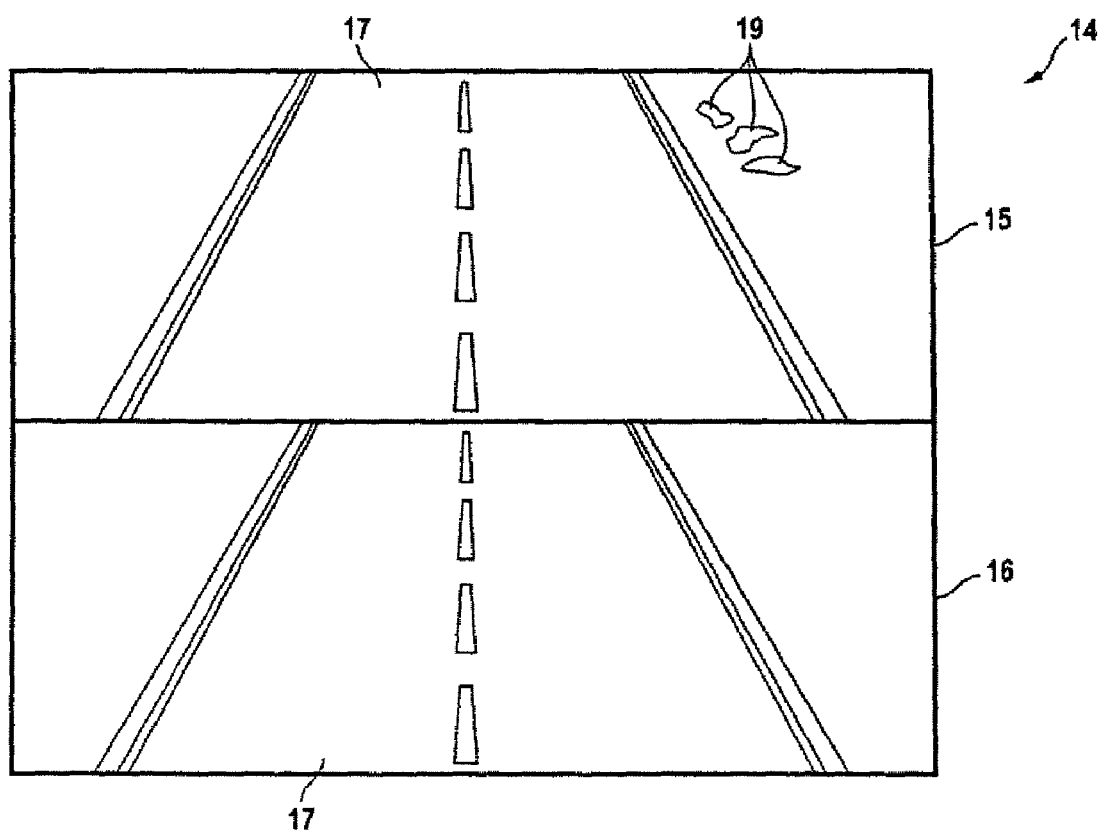
FIG. 2 depicts a typical split screen presentation of data which would be presented to a vehicle operator in practicing the present invention.

The utility of the present invention can be appreciated in reference to FIG. 2. As noted, the split display screen 14 displays roadway 17 and its surrounding topography. The image displayed in lower half 16 of display 14 is an image taken of a roadway at an earlier date and time. Roadway 17 and its surrounding topography displayed in upper screen portion 15 shows a similar portion of the roadway, each view expanded horizontally to enhance visual recognition of horizontally presented objects such as objects 19 sitting on the outside of shoulder 18. Images generated are ideally taken with a telephoto lens in order to provide adequate time for a vehicle operator to take action in the event that the operator wishing to investigate the nature of new objects 19 in the event they represent potential hazards applied to the roadway by such as fallen trees or earthquake created obstacles.

The image generated in row or frame 16, that is, that showing a previous depiction of a roadway and surrounding topography can be acquired from a multitude of sources such as previous vehicle runs. Such information can be electronically submitted to a central server which can be accessed by remote displays.

The main hardware components involved are a laptop PC, server or DVD burning system, small GPS receiver and a video camera, or other sensor providing 2 or more dimensions of data. The principle software components include simultaneous video/data capture and playback, the capturing of location and orientation information from sensors on USB and/or serial ports, utilizing "meta tags" to associate the different data sets, storing the data in a format that can be shared or combined with other geo-spatial information, techniques for annotating the stored imagery to locate features such as potentially dangerous areas along the route, an interface to interact with the data and a way to share the data with others who will travel the same route at a later time.

An advanced functionality under consideration includes the ability to track or predict viewpoint motion in cases of a limited GPS signal. This can be done by inertial sensors or a technique of identifying the closest frame selected from a sequence of frames with known GPS positions.

Other identified significant applications include training and dispatch or route planning. Driving simulators would be improved from the current cartoon like images to real video.

Nighttime operations with IR and thermal sensors and alternative sources such as magnetic maps or ladar can also be utilized.

A simple training device is a DVD of the recorded route that is played on a DVD player.

As to simultaneous video capture and playback, live video will be displayed with previously captured imagery in an over/under fashion on two parts of the screen to facilitate change detection comparison. To create a random accessible database (as opposed to an MPEG video stream) a JPEG storage architecture can be used. The capture of the still images will be based upon parameters including the distance traveled and heading.

Turning to capturing location and orientation information from sensors on USB and/or serial ports, the video, GPS and heading sensors will interface to the system through the USB or serial ports and or video frame grabbers. A Panasonic® Toughbook® PC, for example, will host software to pull and retrieve information from the sensors on these ports.

"Meta tags" are used to associate the different data sets. "Meta tags" are a way to associate different data sets without requiring explicit relationships to be exercised. This system will utilize "meta tags" to relate features including the location and orientation of a viewpoint with its corresponding image. Time of day and unusual occurrences can also be "meta tagged". It is part of the invention to include the heading information in the "meta tag" so that the direction of travel going north or south can determine the proper image. Other data can be elevation and annotations of unusual occurrences. Pre-determined commands can also be embedded in the data and are only displayed in proximity to annoted geo-referenced "meta tagged" markers.

Data is stored in a format that can be shared or combined with other geo-spatial information. The system will store the data in a format that can be used with other geo-spatial products such as those routinely used in the geo mapping industry with layers for features such as elevations, names of streets, rivers wireframes or shape files such as those from ESRI.

The present invention provides a way to share the data with others who will travel the same route at a later time. A client server model (data file management server) can be used to store and share the data amongst patrons. Data can be transferred between the client and server using networks or DVDs or other data media. Capture laptops will have DVD recording systems that will be able to publish DVDs for distribution to the server or directly to other users. The system design and topology will depend on what type of network infrastructure and bandwidth is available in a given community. The server will have a top down map view of the acquired vehicle paths. Any point on a path can be mouse clicked to provide the specific in vehicle view.

As an example, a PC or laptop computers could be employed. Webcam and video sources can be used including images having a 9-degree field of view for small objects seen at 100 meters or a wider field of view for curved streets or urban environments.

It is believed that the mind's ability to register non-conforming images is vastly underestimated. By presenting images on a single split screen one on top of the other enables a viewer to immediately recognize irregularities and often times one can determine the relevance of such differences while ignoring different camera positions, fields of view, contrast, shadows and color differences between the images. Other techniques such as alternating the frames at various rates, super imposition, matting of features, or fusing of the imagery can also be used.

It is contemplated that a previously recorded view of a roadway including surrounding topography could be projected and compared to a real time view of the same region projected on the windshield of a moving vehicle as well. This may be useful for nighttime driving. However, a preferred embodiment is to provide a split screen whereby previously recorded video is compared with live video taken from a vehicle moving along a roadside. By providing one scene over another coordinated through the use of GPS coordinates "meta tagged" within a computing system, the vehicle operator can most readily detect differences between the "before and now" videos. The current embodiment relies upon commercial off-the-shelf GPS technology to retrieve a previously recorded reference view from a database that is nearly identical to the current "live" vehicle-mounted camera view. Again, ideally, both video views are simultaneously presented on a single display for visual comparison. Such a technique presents the two views in a manner that significantly augments and enhances the operator's natural ability to detect a "change" of new surface object. Semi-automated change detection software may also be employed to highlight disparities between the views. Such software is available commercially. In another variation, the rapid presentation between the before and after pictures creates an animation with the changed parts of the picture appearing to blink on and off.

In contemplating software applications, it is noted that single frames are available as geo-referenced data frames, but are used as top down map views. Several commercially available software packages are video based, but they generally use an MPEG compression protocol noting that only the initial frame could be geo-referenced and easily selectable without excessive decoding. MPEG compression further requires additional processing bandwidth and the utilization, again, of key frames. The use of key frames presents significant problems for accessing a specific frame within two points and would require significant database management tools. It was found that JPEG compression could be more viable by eliminating the need for key frame reference and complex data accessing and data management tools.

The present invention has been described as using video or thermal cameras to produce images. Different combinations can also be used for the before and current situation data sets such as a daylight video color camera for the acquisition and a black and white thermal sensor for a current night time image. In using thermal cameras, the present invention can be utilized at night while providing the necessary image recognition and image differentiation presentations for carrying out the present invention from the daytime image. Imagery can also be computer generated from wire frame and/or texture maps. Magnetic profiles, multi-spectral imagery, radar, sonar or ladar are also viable for use in practicing the present invention. Road like video, thermal HD, or low light NTSC video could also be employed as viable video sources noting that the key in practicing the present invention is the production of geo-referenced discreet raster based imagery.

It is contemplated that, as an embodiment, the data produced from geo-mapping a specific route can be stored in a format that can be shared or combined with other geo-spatial information. There have been geo-spatial extensions created for databases such as Oracle® sourced software or ESRI to make database access easier. The formats for exchanging information have been developed by organizations such as that available online at www.opengis.org. It is noted that the International Standard ISO 19136, the Geographic Information-Geography Markup Language (GML) contains instructions to store, combine and/or relate information with other geo-spatially reference data sets. There is a feature sub-type that has a coverage function over a spatial domain such as population and density, and an observation is considered to be something like a photo or measurement, noted with a time and possible other general values for the observation. The present invention intends to utilize the observation features as a template for data storage. Notations such as cautions can also be made that are referenced and stored with time captured and GPS location camera orientation noted as references. Noting that Open GIS specification includes portrayals of geographic information, map-type interfaces can be employed using symbols on suitable maps that display points of observation and thus will allow others to retrieve and display information interfaces created in the practice of the present invention.

Although the preferred embodiment in practicing the present invention contemplates a comparison between archival video taken from a vehicle and comparing it to real time video taken in substantially the same orientation, that is, from a moving vehicle, alternative video sources such as forward looking aerial and down looking reconnaissance can be employed herein. Skewed transformation and cropping can be employed to create a forward-looking aerial view into something akin to a view taken from a land-based vehicle. In doing so, aerial imagery must be employed in conjunction with processing not needed for land based image capture. For example, ego vectors on the aerial camera platform such as pitch, roll and yaw must be accounted for. Alternatively, the vehicle view can be transformed to look like a top down view which could then be used by automated change detection systems in workstations using down looking aerial video. This can be done using a line scanning approach to the sequence of frames. In alternative image manipulation techniques, on camera sensors such as inclinometers and digital compass information can also be tagged to a specific frame and used to calculate the morphing parameters to more closely register before and current imagery.

As noted previously, there are various hardware options available in practicing the present invention. For example, one could use a simple low cost web cam to provide the necessary imagery. Traditional cameras such as palmcorders with image stabilization could also be used effectively. Thermal imagery can be employed. Low light intensified cameras and low light video cameras can also be used as well as images produced by magnetic imagery, radar, sonar and rendered images from depth maps can additionally be employed. If analog video signals are to be employed (NTSC), a frame grabber card with onboard JPEG compression is desirable. This is all capable of being implemented into a personal computer. Alternatively, a video to USB or analog to digital converter can be employed for input sources. A Garmin® GPS device can be employed for geo referencing including the GPS coordinates and time of day or an inertial GPS system could be used.

It is also considered an aspect of the present invention to provide, on an as needed basis, various indicators of potential hazards on the video or appended audio archive. For example, voice commands, magnetic signatures, environmental sound, vehicle velocity, weather conditions, lighting and other environmental factors could be installed onto the memorialized depiction of a scene. On screen warnings of upcoming events, checkpoints, or decision points could be triggered by GPS positioning. In addition, vehicles can communicate with one another using DVD and server laptop data links as well as file management servers.

The software to be employed in practice in the invention must have certain obvious requirements. It must be capable of processing a live camera and sensor input while displaying output on a split screen. Although not required, the simultaneous recording and playback capability provides a system to automatically present the most recent data. The software must be capable of receiving GPS input for current vehicle positioning while selecting from a reference database of views the one view designated by closest GPS coordinates. Although not required, the same GPS coordinates can be employed to shift X and Y coordinates of the rendered view while displaying roadside changes, preferably in stereoscopic 3D based upon monoscopic 2D input signals. Better registration between the recorded and current image can be achieved using known techniques that consider the current camera ego motion and the acquired ego motion acquired from image interpolation or onboard sensors such as inclinometers, accelerometers or a digital compass. This onboard sensor information can be part of the meta-data fields embedded with each acquired image. This later feature is desirable for in depth examination. Again, as noted previously, as a preferred embodiment, the software can also utilize existing semi-automated change detection software to highlight on screen suspected hazards. The software code would utilize on board GPS devices in real time culled from an appropriate database of the most closely stored video frame. The closest GPS view is selected from the database as the onboard camera simultaneously displays both images. The images are ideally expanded horizontally (or squeezed vertically) to make the necessary X, Y adjustments based on road position and or onboard sensors while recording images from onboard cameras to a storage device for future reference. Morphing software can also be used to improve the registration. It is also contemplated that the present invention will track the time and elevation that the video was captured and stored as this information as part of the "meta tag" data set. An XML schema will provide an interface for such information.

As noted previously, real time change detection software can be employed in conjunction with the present invention. Standard Geo Referenced Data (ARC Info/GIS) information can be imported and exported. In addition change detection software can compliment the system. Use of such software can be of assistance to eliminate false positives thus making the present invention more viable to an untrained operator. Images can be displayed to the operator on HMDs, heads down displays, LCDs, projection and laptop screens.

Rural and suburban areas can be mapped and "meta tagged" with a GPS coordinates and stored in an appropriate library. In the event of a natural disaster, such as an earthquake where roadway surfaces and surrounding topography can be substantially altered and thus create a hazard, such alteration could be readily visualized through the use of the present invention.

Furthermore, a camera from a watercraft can be used to precisely navigate a channel and avoid hazards. It can also be used to better land an aircraft in unfamiliar terrain or enter a port and make precise turns in relation to visual objects such as buoys. Comparisons of objects such as power lines, road markers and painted lines, roadside vegetation, tunnels and movement of terrain can also be made.

Use of this invention as a navigational aid during nighttime, or for documenting deliveries of equipment along a route can also be made. For example, a delivery route that includes the specific turns, dock approach and an image of the delivered items on a dock may be of specific interest to train drivers and monitor and document driver performance and serve as a proof of delivery. Precise positioning of a vehicle can be made utilizing the comparison of the perfect position previously recorded to the current position. For example determining when to turn into a channel can be precisely made by matching shoreline trees, docks, buoy positions previously recorded by an expert navigator can be compared to the current position. This same principal can be used by large trucks trying to enter narrow loading docks.

What is claimed is:

1. A method of displaying an enhanced view of a visual field accessible to a mobile image acquisition device, the method comprising:
    capturing a first set of image data in real-time from an image acquisition device associated with a mobile unit;
    determining one or more meta-tags associated with a location of the image acquisition device;
    accessing a second set of image data based on the one or more meta-tags, wherein the second set of image data comprises picture data stored as one or more images associated with the one or more meta-tags; and
    displaying the one or more images when the mobile unit is located in the location.

2. The method of claim 1, wherein capturing the first set of image data in real-time from the image acquisition device associated with the mobile unit comprises:

storing the first set of image data based on GPS at a frame rate dependent on a velocity of the image acquisition device.

3. The method of claim 1, wherein the first set of image data comprises images acquired during reduced visibility relative to the second set of image data.

4. The method of claim 1, wherein the image acquisition device is one of a video or thermal camera.

5. The method of claim 1, wherein the image acquisition device is configured to generate at least one of electromagnetic or acoustic imagery.

6. The method of claim 1, wherein the one or more meta-tags include elevation information relating the image acquisition device.

7. The method of claim 1, wherein the one or more meta-tags include time of day information.

8. The method of claim 1, wherein the one or more meta-tags includes data received from one or more of inertial sensors, inclinometers, accelerometers, digital compasses, or clocks.

9. The method of claim 1, wherein the one or more meta-tags includes information representing a velocity of the image acquisition device.

10. The method of claim 1, wherein the one or more images associated with the one or more meta-tags is sampled from previously-acquired real-time image data based on GPS data.

11. The method of claim 1, wherein the one or more images associated with the one or more meta-tags is computer-generated imagery, the computer-generated imagery derived from one of a texture or wire frame map.

12. The method of claim 1, wherein the picture data is stored in JPEG format.

13. The method of claim 1, wherein the one or more images are accessed randomly from a database, the database being accessible by a plurality of users.

14. The method of claim 1, wherein the first and second sets of image data are displayed simultaneously on two views of one display or two single views in each of two displays in close proximity to one another.

15. The method of claim 14, wherein the two views of the one display or the two displays are situated horizontally one over the other.

16. A method comprising:
    capturing a first set of image data from an image acquisition device, the first set of image data associated with a location of a vehicle;
    accessing a second set of image data, wherein the second set of image data comprises imagery associated with one or more meta-tags;
    comparing the first set of image data with the second set of image data;
    selecting at least one image from the second set of image data that matches the first set of image data; and
    identifying the location of the vehicle based on a meta-tag corresponding to the at least one image from the second set of image data that matches the first set of image data.

17. The method of claim 16, wherein the first and second sets of image data are stored in JPEG format.

18. The method of claim 16, wherein the second set of image data is randomly accessed from a database.

19. The method of claim 16, wherein the one or more meta-tags include GPS coordinate data.

\* \* \* \* \*